Patented Sept. 23, 1924.

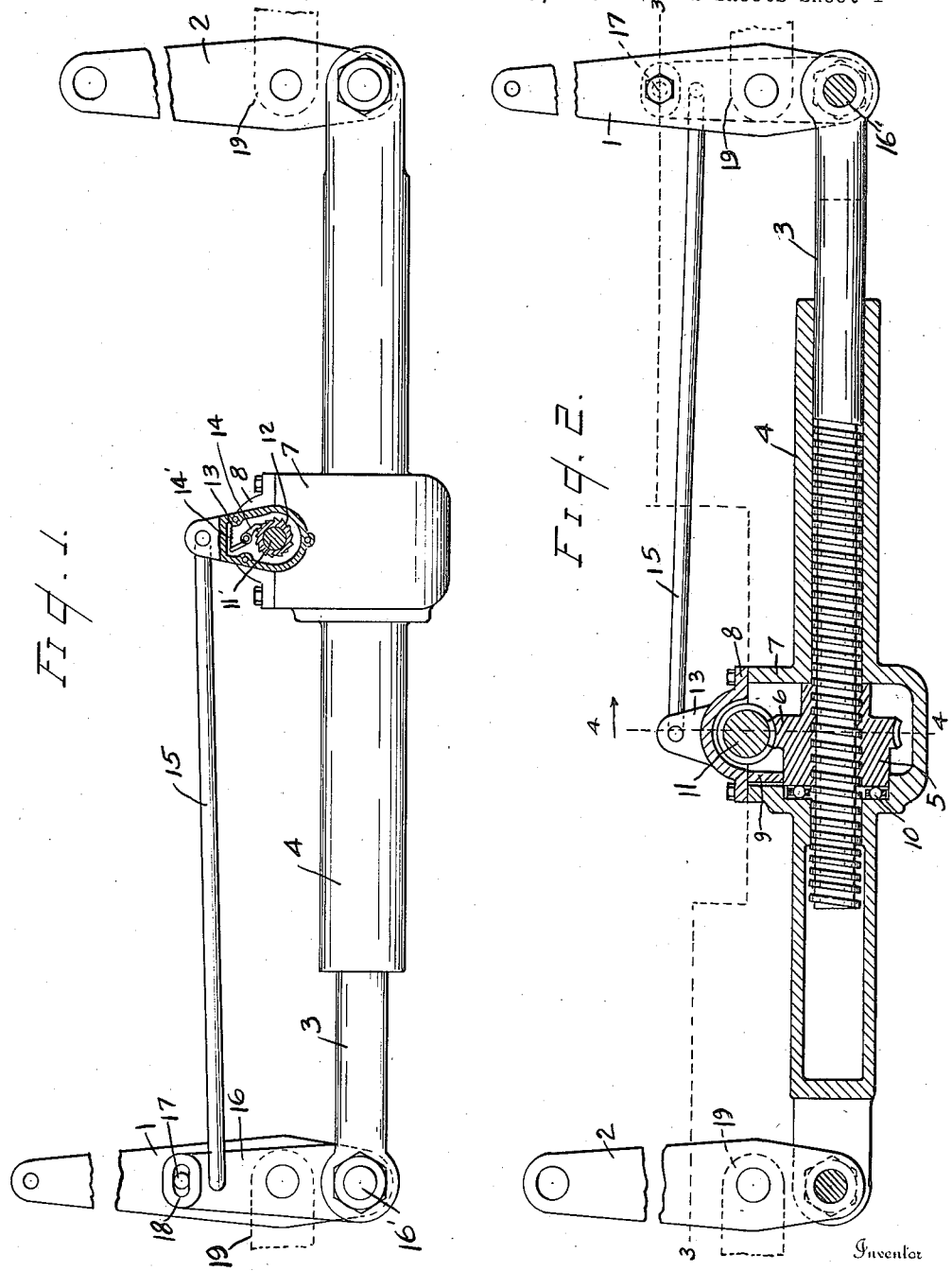

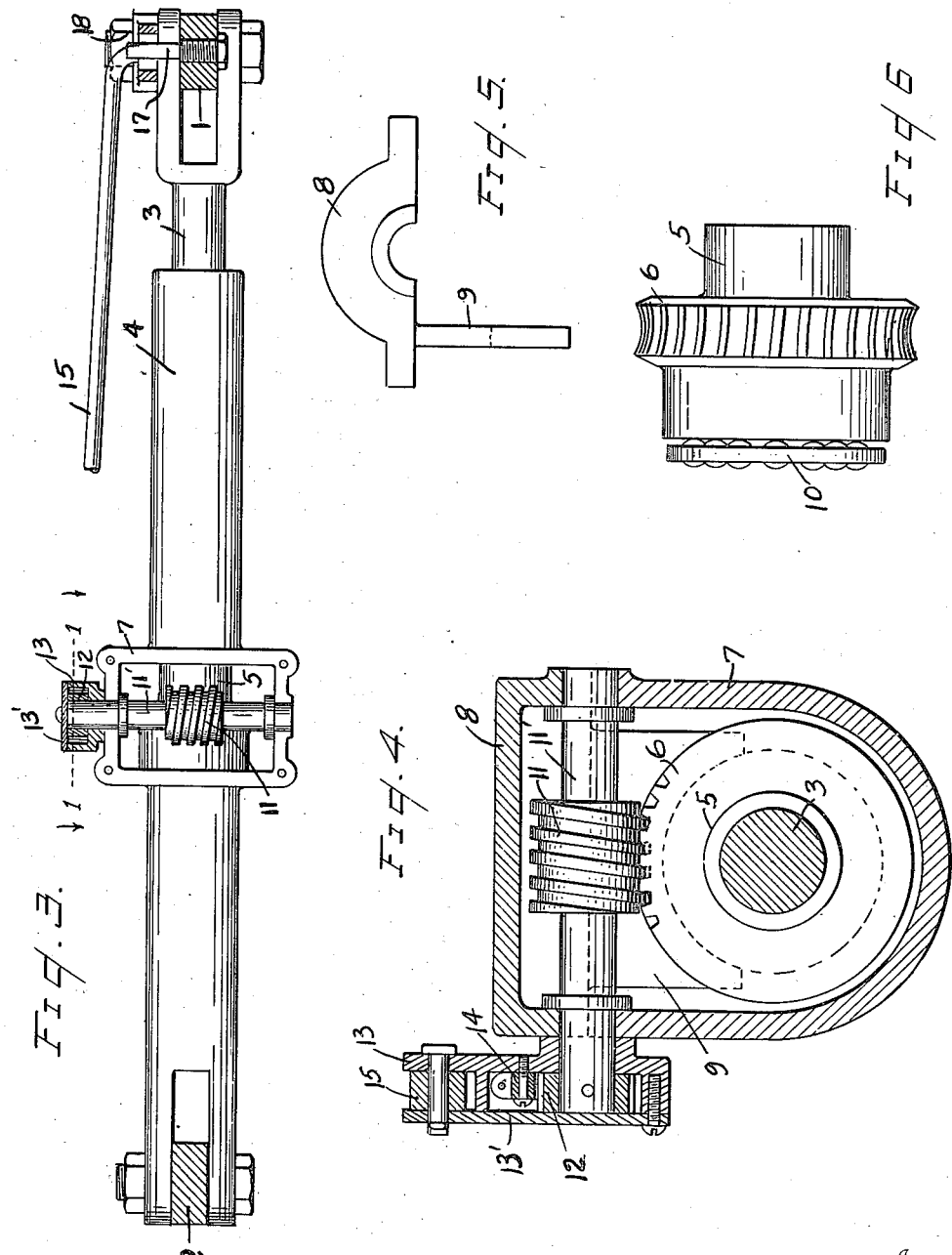

1,509,225

UNITED STATES PATENT OFFICE.

AMEL B. BROLUSKA, OF DETROIT, MICHIGAN.

SLACK ADJUSTER FOR VEHICLE BRAKES.

Application filed June 12, 1922. Serial No. 567,502.

*To all whom it may concern:*

Be it known that I, AMEL B. BROLUSKA, a citizen of the United States, residing at Detroit, in the county of Wayne and State of Michigan, have invented a new and useful Slack Adjuster for Vehicle Brakes, of which the following is a specification.

This invention relates to slack adjusters for vehicle brakes, and more particularly for the brakes of railway cars.

It is the object of the invention to provide an adjusting device for automatically taking up the slack in the actuating mechanism of car brakes, resulting from wear of the brake shoes upon the wheels.

In attaining this object the invention contemplates the provision of a telescopic two-part thrust bar connecting elements of the mechanism which react upon each other in effecting an application and release of the brakes, so as to accomplish an elongation adjustment of said thrust bar when a predetermined amount of slack has resulted from wear on the brake shoes, by means of a worm and worm-wheel mechanism actuable by the excess movement of one of said brake levers, due to such slack.

A preferred embodiment of the invention is hereinafter described, and is illustrated in the accompanying drawings, wherein, Fig. 1 is a view of the improved brake mechanism in side elevation (except for a small portion the plane of section of which is indicated at 1—1 in Fig. 3), the disclosed position of the parts corresponding to the normal or released position of the brakes.

Fig. 2 is a longitudinal vertical sectional view of the same.

Fig. 3 is a horizontal section on line 3—3 of Fig. 2.

Fig. 4 is a cross-section view on line 4—4 of Fig. 2.

Fig. 5 is a detail view in side elevation of a cap for the worm and worm-wheel casing.

Fig. 6 shows in detail the worm-wheel and an anti-friction thrust bearing for the same.

In these views the reference characters 1 and 2 designate respectively the usual actuating and actuated brake levers, and 3 and 4 indicate inner and outer telescoping members which form an adjustable connection between the lower ends of said levers, replacing the usual thrust bar. The inner member 3 is screw-threaded (as clearly shown in Fig. 2) for engagement by a cylindrical nut 5 formed integral with a worm-wheel 6, and adapted to be rotatively driven by the latter. Said worm-wheel occupies a housing 7 formed as an enlargement of the member 4, a removable cap 8 being provided for said housing. Said cap has a flange or rib 9 which projects into the housing 7 and forms jointly with an end wall of said housing a two-part bearing for one end of the nut 5.

Between the worm-wheel 6 and the end wall of the housing 7, which reacts with the worm-wheel to take care of the thrust when the brakes (not shown) are applied, an anti-friction bearing 10 is arranged. Within the housing 7 there is further arranged a worm 11 meshing with said worm-wheel, the shaft 11' of said worm being journaled in opposed walls of said housing and projecting at one end from the housing to carry a ratchet-wheel 12. Said ratchet-wheel, as may best be seen in Fig. 1, is located within a chambered rock arm 13 loose upon said shaft and projecting upwardly therefrom. Said arm is provided with a cover plate 13' for the chamber receiving said ratchet-wheel, said plate being removably secured to the arm by any suitable means. Within the chamber of the arm 13 there is also pivotally mounted a pawl 14 and a coiled spring 14' urging said pawl into engagement with the ratchet wheel. 15 is a rod which is terminally pivotally connected respectively to the free end of the chambered rock arm 13 and to the upper portion of an arm 16, the lower end of which is mounted at 16' co-pivotally with the lever 1 upon the member 3. The upper extremity of the arm 16 has a lost motion connection with the lever 1, established by a pin 17 laterally projecting from said lever and engaging in a slot 18 transversely formed in said arm. The brake beam connections to the levers 1 and 2 are indicated in dash lines at 19.

Considering now the operation of the device, as so far described, it will be understood by those familiar with the art that the actuating lever 1 is swung to the left (referring to Fig. 1) in applying the brake, the pivot member 16' initially providing a fulcrum for this movement, and the brake beam connection 19 forming a fulcrum member during the latter portion of the stroke of the lever. While said lever is fulcruming upon the brake beam connection the thrust bar formed by the members 3 and 4 is being shifted to the right, rocking the secondary lever 2 and actuating the brake beam connection to said lever in a direction opposite to that previously imparted to the other brake beam. Prior to any taking up of slack due to wear, the angular movement of the lever 1, requisite to fully apply the brakes, does not affect the arm 16, the pin 17 carried by the lever 1 having merely a lost motion movement in the slot 18 of said arm. As the bearing faces of the brake shoes (not shown) are gradually worn away, however, the angular travel of the lever 1 in applying the brakes is correspondingly increased, and the invention utilizes this effect upon said lever to take up the slack resulting from wear. Thus the slot 18 is so proportioned in length that a predetermined slight increase in the angular movement of the lever 1 will engage the pin 17 with the right-hand extremity of the slot 18 (see Fig. 1) and shift the arm 16 more or less to the left as the brakes are applied. Such action of the arm 16 will result in a pull being exerted through the rod 15 upon the chambered rock arm 13 which will be swung toward the arm 16, and through a somewhat greater angular distance than said arm since the latter is the longer. Thus the pawl 14 will me caused to ride over the teeth of the ratchet wheel 12 counter to the direction of actuation of the latter. Upon releasing of the brakes the arm 16 will be reversely actuated, after taking up the lost motion between the lever 1 and said arm, and a reverse swinging movement of the chambered rock arm 13 will be effected by the rod 15. During this reverse movement of said chambered arm, the pawl 14 has driving engagement with the ratchet wheel 12, and through the latter the worm 11 is turned, driving the nut 5 in such a direction upon the threads of the member 3 as to shift said member outwardly of the member 4, thus effecting a predetermined elongation of the members 3, 4, and thereby taking up the slack.

It is a feature of the described construction that the screw-threaded engagement of the member 3 with the worm driven nut 5 securely locks the parts 3 and 4 in any position of adjustment, since longitudinal movement of the nut relative to the member 4 is prohibited by engagement of said nut in the housing 7, and rotation of the nut is prevented by engagement with the worm. Thus the parts are rendered irreversible and no means is required auxiliary to the adjusting mechanism for maintaining adjustment.

It is to be observed that the slack is taken up during releasing of the brakes, rather than during application thereof, so that the thrust bar is not under compressive stress when undergoing elongation adjustment.

What I claim is:

1. In a slack take-up mechanism for vehicle brakes, a thrust member comprising inner and outer telescoping members, the inner member having a screw-threaded portion and the outer member having a housing through which said portion extends, a nut within said housing engaging said screw-threaded portion and having end bearing engagement with said housing, a worm-wheel carried by said nut, a worm within the housing engaging said nut, a removable cap for said housing having a portion co-acting with the housing proper to journal said nut, a brake lever connected to one end of said thrust member, and a lost motion drive connection from said brake lever to said worm, effective only upon taking up of the lost motion thereof through an abnormal angular movement of said lever.

2. In a slack take-up mechanism for vehicle brakes, a thrust member comprising inner and outer telescoping members, the inner member having a screw-threaded portion and the outer member having a housing through which said screw-threaded portion extends, a nut axially confined within said housing and engaging said screw-threaded portion, a shaft journaled in said housing transversely to the axis of said nut, a drive connection from said shaft to said nut, a chambered rock arm pivoted upon said shaft, a pawl and ratchet drive connection to said shaft from said rock arm, within the chamber of said arm, a brake lever connected to one end of said thrust member, and a lost-motion drive connection from said lever to said shaft, effective only upon taking up of the lost motion through an abnormal angular movement of the lever.

In testimony whereof I sign this specification.

AMEL B. BROLUSKA.